(12) United States Patent
Shankland

(10) Patent No.: US 6,586,488 B1
(45) Date of Patent: *Jul. 1, 2003

(54) AZEOTROPE-LIKE COMPOSITIONS OF 1,1,1,3,3-PENTAFLUOROPROPANE AND HYDROCARBONS

(75) Inventor: Ian Robert Shankland, Williamsville, NY (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/872,436

(22) Filed: Jun. 10, 1997

Related U.S. Application Data

(60) Continuation of application No. 08/729,701, filed on Oct. 7, 1996, now Pat. No. 5,677,358, which is a division of application No. 08/630,239, filed on Apr. 10, 1996, now Pat. No. 5,672,294.

(51) Int. Cl.[7] .............................. C08J 9/14; C09K 5/04; C11D 7/30
(52) U.S. Cl. ...................... 521/131; 521/155; 521/902; 252/67; 252/69; 252/364; 62/114; 570/134; 510/415; 510/408; 510/177; 585/1; 585/2
(58) Field of Search .................. 252/67, 69, 364; 62/114; 570/134; 585/1, 2; 521/131, 155, 902; 510/415, 408, 177

(56) References Cited

U.S. PATENT DOCUMENTS

| | | | | |
|---|---|---|---|---|
| 4,898,893 A | | 2/1990 | Ashida ....................... 521/131 |
| 5,096,933 A | * | 3/1992 | Volkert ....................... 521/131 |
| 5,106,527 A | | 4/1992 | Doerge et al. ............... 252/172 |
| 5,308,881 A | * | 5/1994 | Londrigan et al. ........... 521/112 |
| 5,362,764 A | * | 11/1994 | Londrigan et al. .......... 521/112 |
| 5,426,127 A | * | 6/1995 | Doerge ....................... 521/131 |
| 5,433,880 A | * | 7/1995 | Minor et al. ................. 252/67 |
| 5,441,659 A | * | 8/1995 | Minor ......................... 252/67 |
| 5,461,084 A | * | 10/1995 | Doerge ....................... 521/167 |
| 5,496,866 A | * | 3/1996 | Sommerfeld et al. ....... 521/131 |
| 5,538,659 A | * | 7/1996 | Chisolm et al. ............. 252/67 |
| 5,558,810 A | * | 9/1996 | Minor et al. ................. 252/67 |
| 5,562,857 A | * | 10/1996 | Werner et al. ............... 252/67 |
| 5,672,294 A | * | 9/1997 | Lund et al. .................. 252/67 |
| 5,677,358 A | * | 10/1997 | Lund et al. ................. 521/131 |
| 5,866,029 A | * | 2/1999 | Lund et al. .................. 252/67 |

FOREIGN PATENT DOCUMENTS

| | | |
|---|---|---|
| EP | 0 783 017 A2 | 7/1997 |
| JP | 239251-1993 | 9/1993 |
| WO | WO 97/31989 | 9/1997 |

OTHER PUBLICATIONS

Patent Abstract of Japan, publication No. 05239251, dated Sep. 17, 1993, Daikin Ind. Ltd.

* cited by examiner

*Primary Examiner*—Rabon Sergent
(74) *Attorney, Agent, or Firm*—Colleen D. Szuch

(57) ABSTRACT

Azeotrope-like compositions of 1,1,1,3,3-pentafluoropropane and at least one hydrocarbon selected from the group n-pentane, iso-pentane, cyclopentane, n-hexane and iso-hexane are provided. The compositions of the invention are useful in the preparation of polyurethane and polyisocyanurate foams.

6 Claims, No Drawings

AZEOTROPE-LIKE COMPOSITIONS OF 1,1,1,3,3-PENTAFLUOROPROPANE AND HYDROCARBONS

This application is a continuation of U.S. patent application Ser. No. 08/729,701 filed Oct. 7, 1996 (now U.S. Pat. No. 5,677,358), which is a division of U.S. patent application Ser. No. 08/630,239 filed Apr. 10, 1996 (now U.S. Pat. No. 5,672,294).

FIELD OF THE INVENTION

This invention relates to azeotrope-like compositions that include 1,1,1,3,3-pentafluoropropane and at least one hydrocarbon selected from the group n-pentane, isopentane, cyclopentane, n-hexane and isohexane. The compositions of the invention are useful as blowing agents in the manufacture of rigid and flexible polyurethane foams and polyisocyanurate foams as well as aerosol propellants.

BACKGROUND OF THE INVENTION

Rigid polyurethane and polyisocyanurate foams are manufactured by-reacting and foaming a mixture of ingredients, in general an organic polyisocyanate with a polyol or mixture of polyols, in the presence of a volatile liquid blowing agent. The blowing agent is vaporized by the heat liberated during the reaction of isocyanate and polyol causing the polymerizing mixture of foam. This reaction and foaming process may be enhanced through the use of various additives such as amine or tin catalysts and surfactant materials that serve to control and adjust cell size and to stabilize the foam structure during formation. Foams made with blowing agents such as $CCl_3F$ ("CFC-11") and $CCl_2FCH_3$ ("HCFC-141b") offer excellent thermal insulation, due in part to the very low thermal conductivity of CFC- 11 and HCFC- 141b vapor, and are used widely in insulation applications.

Flexible polyurethane foams are generally open-cell foams manufactured using an excess of diisocyanate that reacts with water, also included as a raw material, producing gaseous carbon dioxide and causing foam expansion. The flexible foams are widely used as cushioning materials in items such as furniture, bedding, and automobile seats. Auxiliary physical blowing agents such as methylene chloride and/or CFC-11 are required in addition to the water/diisocyanate blowing mechanism in order to produce low density, soft grades of foam.

Many foam producers have converted from chlorofluorocarbon ("CFC") blowing agents, such as CFC- 11, to environmentally safer hydrochlorofluorocarbon ("HCFC") agents and hydrocarbons. However, HCFCs, such as HCFC-141b, also have some propensity to deplete stratospheric ozone albeit significantly less than that of the CFCs.

Hydrocarbon agents, such as n-pentane, isopentane, and cyclopentane, do not deplete stratospheric ozone, but are not optimal agents because foams produced from these blowing agents lack the same degree of thermal insulation efficiency as foams made with the CFC or HCFC blowing agents. Further, the hydrocarbon blowing agents are extremely flammable. Because rigid polyurethane foams must comply with building code or other regulations, foams expanded with a blowing agent composed only of hydrocarbons often require addition of expensive flame retardant materials to meet the regulations. Finally, hydrocarbon blowing agents are classified as Volatile Organic Compounds and present environmental issues associated with photochemical smog production in the lower atmosphere.

In contrast to the foregoing blowing agents, hydrofluorocarbons ("HFCs") such as 1,1,1,3,3-pentafluoropropane ("HFC-245fa") do not deplete stratospheric ozone. This invention provides azeotrope-like compositions based on HFC-245fa and hydrocarbons for use as blowing agents for polyurethane-type foams.

Azeotropic blowing agents possess certain advantages such as more efficient blowing than the individual components, lower thermal conductivity or K-factor, and better compatibility with other foam raw materials. Additionally, azeotropic or azeotrope-like compositions are desirable because they do not fractionate upon boiling or evaporation. This behavior is especially important where one component of the blowing agent is very flammable and the other component is nonflammable because minimizing fractionation during a leak or accidental spill minimizes the risk of producing extremely flammable mixtures.

This invention provides azeotrope-like compositions that are environmentally safe substitutes for CFC and HCFC blowing agents, that have a reduced propensity for photochemical smog production, and that produce rigid and flexible polyurethane foams and polyisocyanurate foams with good properties. The invention also provides blowing agent compositions with reduced flammability hazards compared to hydrocarbon blowing agents.

Foams made with the blowing agent compositions of this invention exhibit improved properties, such as thermal insulation efficiency, improved solubility in foam raw materials, and foam dimensional stability, when compared to foams made with hydrocarbon blowing agents alone. Although the compositions of the invention contain a hydrocarbon, it is present as a minor component and, overall, the compositions are nonflammable.

DETAILED DESCRIPTION OF THE INVENTION

This invention provides azeotrope-like compositions comprising 245fa and at least one hydrocarbon selected from the group consisting of n-pentane, isopentane, cyclopentane, n-hexane, isohexane, and mixtures thereof that are useful as blowing agents for polyurethane and polyisocyanurate foams.

For azeotrope-like mixtures containing n-pentane, the azeotrope-like compositions comprise from about 5 to about 70 percent by weight n-pentane and from about 95 to about 30 percent by weight HFC-245fa and have a boiling point $9\pm1°$ C. at 745 mm Hg. In a preferred embodiment, such azeotrope-like compositions comprise from about 5 to about 35 percent by weight n-pentane and from about 95 to about 65 percent by weight HFC-245fa and have a boiling point of $9\pm0.5°$ C. at 745 mm Hg.

For azeotrope-like mixtures containing isopentane, the azeotrope-like compositions comprise from about 5 to about 70 percent by weight isopentane and from about 95 to about 30 percent by weight HFC-245fa and have a boiling point $7\pm1°$ C. at 748 mm Hg. In a preferred embodiment, such azeotrope-like compositions comprise from about 5 to about 45 percent by weight isopentane and from about 95 to about 55 percent by weight HFC-245fa and have a boiling point of $7\pm0.5°$ C. at 748 mm Hg For azeotrope-like mixtures containing cyclopentane, the azeotrope-like compositions comprise from about 5 to about 60 percent by weight cyclopentane and from about 95 to about 40 percent by weight HFC-245fa and have a boiling point $11.7\pm1°$ C. at 745 mm Hg. In a preferred embodiment, such azeotrope-like compositions comprise from about 5 to about 40 percent by weight cyclopentane and from about 95 to about 60 percent by weight HFC-245fa and have a boiling point of 11.7±0.5° C. at 745 mm Hg.

For azeotrope-like mixtures containing n-hexane, the azeotrope-like compositions comprise from about 2 to about 45 percent by weight n-hexane and from about 98 to about 55 percent by weight HFC-245fa and have a boiling point 14±1° C. at 749 mm Hg. In a preferred embodiment, such azeotrope-like compositions comprise from about 2 to about 30 percent by weight n-hexane and from about 98 to about 70 percent by weight HFC-245fa and have a boiling point of 14±0.5° C. at 749 mm Hg.

For azeotrope-like mixtures containing isohexane, the azeotrope-like compositions comprise from about 2 to about 45 percent by weight isohexane and from about 98 to about 55 percent by weight HFC-245fa and have a boiling point 13.5±1° C. at 744 mm Hg. In a preferred embodiment, such azeotrope-like compositions comprise from about 2 to about 25 percent by weight isohexane and from about 98 to about 75 percent by weight HFC-245fa and have a boiling point of 13.5±0.5° C. at 744 mm Hg.

The azeotrope-like compositions of the invention exhibit zero ozone depletion and low global warming potential. Further, the HFC-245fa component reduces the flammability hazard associated with handling and using the blowing agent, especially when compared to the use of the hydrocarbon component alone.

Polyurethane foams expanded with the blowing agents of the invention exhibit superior performance to foams expanded with the hydrocarbon blowing agent alone. The thermal conductivity of foams prepared using the azeotrope-like compositions of the invention is lower, hence superior, when compared to the thermal conductivity of foams expanded with just the hydrocarbon blowing agent. Improved dimensional stability, especially at low temperature, is also observed.

From fundamental principles, the thermodynamic state of a fluid is defined by four variables: pressure; temperature; liquid composition; and vapor composition. An azeotrope is a unique characteristic of a system of two or more components in which the liquid and vapor compositions are equal at a stated pressure and temperature. In practice this means that the components cannot be separated during a phase change.

All compositions of the invention within the indicated ranges, as well as certain compositions outside the indicated ranges, are azeotrope-like. For the purposes of the invention, by azeotrope-like composition is meant that the composition behaves like a true azeotrope in terms of this constant boiling characteristic or tendency not to fractionate upon boiling or evaporation. Thus, in such systems, the composition of the vapor formed during the evaporation is identical, or substantially identical, to the original liquid composition. During boiling or evaporation of azeotrope-like compositions, the liquid composition, if it changes at all, changes only slightly. This is contrasted with non-azeotrope-like compositions in which the liquid and vapor compositions change substantially during evaporation or condensation.

One way to determine whether a candidate mixture is azeotrope-like within the meaning of this invention, is to distill a sample thereof under conditions, i.e., resolution—number of plates, that would be expected to separate the mixture into its separate components. If the mixture is non-azeotropic or non-azeotrope-like, the mixture will fractionate, or separate into its various components, with the lowest boiling component distilling off first, and so on. If the mixture is azeotrope-like, some finite amount of the first distillation cut will be obtained which contains all of the mixture components and which is constant boiling or behaves as a single substance. This phenomenon cannot occur if the mixture is not azeotrope-like, or not part of an azeotropic system.

Another characteristic of azeotrope-like compositions is that there is a range of compositions containing the same components in varying proportions which are azeotrope-like. All such compositions are intended to be covered by the term azeotrope-like as used herein. As an example, it is well known that at different pressures the composition of a given azeotrope will vary at least slightly as does the boiling point of the composition. Thus, an azeotrope of A and B represents a unique type of relationship but with a variable composition depending on the temperature and/or pressure.

In the process embodiments of the invention, the azeotrope-like compositions of the invention may be used in methods for producing a rigid closed-cell polyurethane, a flexible open-cell polyurethane, or polyisocyanurate foam. In respect to the preparation of rigid or flexible polyurethane or polyisocyanurate foams using the azeotrope like compositions described in the invention, any of the methods well known in the art can be employed. See Saunders and Frisch, *Volumes I and II Polyurethanes Chemistry and Technology* (1962). In general, polyurethane or polyisocyanurate foams are prepared by combining an isocyanate, a polyol or mixture of polyols, a blowing agent or mixture of blowing agents, and other materials such as catalysts, surfactants, and optionally, flame retardants, colorants, or other additives.

It is convenient in many applications to provide the components for polyurethane or polyisocyanurate foams in preblended formulations. Most typically, the foam formulation is preblended into two components. The isocyanate, optionally certain surfactants, and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix, for small preparations, or preferably machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a third stream to the mix head or reaction site. Most conveniently, however, they are all incorporated into one B Component.

Any organic polyisocyanate can be employed in polyurethane or polyisocyanurate foam synthesis inclusive of aliphatic and aromatic polyisocyanates. Preferred as a class are the aromatic polyisocyanates. Preferred polyisocyanates for rigid polyurethane or polyisocyanurate foam synthesis are the polymethylene polyphenyl isocyanates, particularly the mixtures containing from about 30 to about 85 percent by weight of methylenebis(phenyl isocyanate) with the remainder of the mixture comprising the polymethylene polyphenyl polyisocyanates of functionality higher than 2. Preferred polyisocyanates for flexible polyurethane foam synthesis are toluene diisocyantes including, without limitation, 2,4-toluene diisocyanate, 2,6-toluene diisocyanate, and mixtures thereof Typical polyols used in the manufacture of rigid polyurethane foams include, but are not limited to, aromatic amino-based polyether polyols such as those based on mixtures of 2,4- and 2,6-toluenediamine condensed with ethylene oxide and/or propylene oxide. These polyols find utility in pour-in-place molded foams. Another example is aromatic alkylamino-based polyether polyols such as those based on ethoxylated and/or propoxylated aminoethylated nonylphenol derivatives. These polyols generally find utility in spray applied polyurethane foams. Another example is sucrose-based polyols such as those based on sucrose derivatives and/or mixtures of sucrose and glycerine derivatives condensed with ethylene oxide and/or propylene oxide. These polyols generally find utility in pour-in-place molded foams.

Typical polyols used in the manufacture of flexible polyurethane foams include, but are not limited to, those based on glycerol, ethylene glycol, trimethylolpropane, ethylene diamine, pentaerythritol, and the like condensed with ethylene oxide, propylene oxide, butylene oxide, and the like. These are generally referred to as "polyether polyols". Another example is the graft copolymer polyols which include, but are not limited to, conventional polyether polyols with vinyl polymer grafted to the polyether polyol chain. Yet another example is polyurea modified polyols which consist of conventional polyether polyols with polyurea particles dispersed in the polyol.

Examples of polyols used in polyurethane modified polyisocyanurate foams include, but are not limited to, aromatic polyester polyols such as those based on complex mixtures of phthalate-type or terephthalate-type esters formed from polyols such as ethylene glycol, diethylene glycol, or propylene glycol. These polyols are used in rigid laminated boardstock, and may be blended with other types of polyols such as sucrose based polyols, and used in polyurethane foam applications.

Catalysts used in the manufacture of polyurethane foams are typically tertiary amines including, but not limited to, N-alkylmorpholines, N-alkylalkanolamines, N,N-dialkylcyclohexylamines, and alkylamines where the alkyl groups are methyl, ethyl, propyl, butyl and the like and isomeric forms thereof, as well as hetrocyclic amines. Typical, but not limiting, examples are triethylenediamine, tetramethylethylenediamine, bis(2-dimethylaminoethyl) ether, triethylamine, tripropylamine, tributylamine, triamylamine, pyridine, quinoline, dimethylpiperazine, piperazine, N,N-dimethylcyclohexylamine, N-ethylmorpholine, 2-methylpiperazine, N,N-dimethylethanolamine, tetramethylpropanediamine, methyltriethylenediamine, and mixtures thereof Optionally, non-amine polyurethane catalysts are used. Typical of such catalysts are organometallic compounds of lead, tin, titanium, antimony, cobalt, aluminum, mercury, zinc, nickel, copper, manganese, zirconium, and mixtures thereof Exemplary catalysts include, without limitation, lead 2-ethylhexoate, lead benzoate, ferric chloride, antimony trichloride, and antimony glycolate. A preferred organo-tin class includes the stannous salts of carboxylic acids such as stannous octoate, stannous 2-ethylhexoate, stannous laurate, and the like, as well as dialkyl tin salts of carboxylic acids such as dibutyl tin diacetate, dibutyl tin dilaurate, dioctyl tin diacetate, and the like.

In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art including, but not limited to, glycine salts and tertiary amine trimerization catalysts, alkali metal carboxylic acid salts, and mixtures thereof Preferred species within the classes are potassium acetate, potassium octoate, and N-(2-hydroxy-5-nonylphenol)methyl-N-methylglycinate.

Dispersing agents, cell stabilizers, and surfactants may be incorporated into the present blends. Surfactants, better known as silicone oils, are added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917,480, and 2,846,458,.

Other optional additives for the blends may include flame retardants such as tris(2-chloroethyl)phosphate, tris(2-chloropropyl)phosphate, tris(2,3-dibromopropyl)phosphate, tris(1,3-dichloropropyl)phosphate, diammonium phosphate, various halogenated aromatic compounds, antimony oxide, aluminum trihydrate, polyvinyl chloride, and the like. Other optional ingredients may include from 0 to about 3 percent water, which chemically reacts with the isocyanate to produce carbon dioxide. The carbon dioxide acts as an auxiliary blowing agent.

Also included in the mixture are blowing agents or blowing agent blends as disclosed in this invention. Generally speaking, the amount of blowing agent present in the blended mixture is dictated by the desired foam densities of the final polyurethane or polyisocyanurate foams products. The proportions in parts by weight of the total blowing agent blend can fall within the range of from 1 to about 45 parts of blowing agent per 100 parts of polyol, preferably from about 4 to about 30 parts.

The polyurethane foams produced can vary in density from about 0.5 pound per cubic foot to about 40 pounds per cubic foot, preferably from about 1.0 to about 20.0 pounds per cubic foot, and most preferably from about 1.5 to about 6.0 pounds per cubic foot for rigid polyurethane foams and from about 1.0 to about 4.0 pounds per cubic foot for flexible foams. The density obtained is a function of how much of the blowing agent, or blowing agent mixture, of the invention is present in the A and/or B components, or that is added at the time the foam is prepared.

The HFC-245fa component of the novel azeotrope-like compositions of the invention is a known material and can be prepared by methods known in the art such as those disclosed in WO 94/14736, WO 94/29251, WO 94/29252. The hydrocarbon components are known materials that are available commercially and are used in various grades ranging from 75% to 99% purities. For the purposes of the present invention n-pentane, isopentane, cyclopentane, n-hexane and isohexane refer to all such commercial grades of material.

This invention is further illustrated by the following non-limiting examples in which parts or percentages are by weight unless otherwise specified.

EXAMPLE 1

This example shows that a minimum boiling azeotrope forms between HFC-245fa and a hydrocarbon selected from the group n-pentane, isopentane, cyclopentane, n-hexane and isohexane. The example also shows that these mixtures exhibit azeotrope-like or constant boiling behavior over a range of compositions.

Boiling point measurements were performed using an ebulliometric technique similar to that described by W. Swietoslawski in *Ebulliometric Measurements*, Reinhold Publishing Corp. (1945). The ebulliometer was first charged with a weighed amount of HFC-245fa. The system was brought to total reflux by gently heating the lower part of the ebulliometer. The temperature of the boiling liquid was measured using a precision quartz-sheathed 25 ohm platinum resistance thermometer, accurate to ±0.01° C. Boiling temperature and atmospheric pressure were recorded after steady-state had been attained. An aliquot of n-pentane was then added volumetrically to the ebulliometer and the boiling temperature and atmospheric pressure recorded after the new steady-state had been achieved. This process was repeated with additional aliquots of n-pentane.

The following Table I summarizes the boiling point measurements for various mixtures of HFC-245fa and n-pentane. The data summarized in Table I indicate a minimum in the boiling point versus composition curve for HFC-245fa and n-pentane indicate that these two components form a positive azeotrope. The data also indicate that constant-boiling or azeotrope-like mixtures are formed over a range of compositions of these two components. The boiling point at 745 mm Hg pressure is constant at 9±1° C. from about 5 to about 70 weight percent n-pentane and from about 95 to about 30 weight percent HFC-245fa. The boiling point is constant at 9±0.5° C. from about 5 to about 35 weight percent n-pentane and from about 95 to about 65 weight percent HFC-245fa.

TABLE I

HFC-245fa/N-Pentane Boiling Point Data

| Weight Percent HFC-245fa | Weight Percent N-Pentane | Boiling Point (° C.) at 745 mm Hg |
|---|---|---|
| 100.0 | 0.0 | 14.58 |
| 99.59 | 0.41 | 14.51 |
| 98.65 | 1.35 | 13.70 |
| 97.98 | 2.02 | 11.73 |
| 96.05 | 3.95 | 9.32 |
| 94.80 | 5.20 | 9.27 |
| 92.40 | 7.60 | 9.20 |
| 90.11 | 9.89 | 9.15 |
| 84.87 | 15.13 | 9.15 |
| 79.33 | 20.67 | 9.15 |
| 76.02 | 23.98 | 9.16 |
| 73.0 | 27.0 | 9.17 |
| 70.2 | 29.8 | 9.18 |
| 65.2 | 34.8 | 9.20 |
| 49.7 | 50.3 | 9.28 |
| 42.3 | 57.7 | 9.38 |
| 31.6 | 68.4 | 9.65 |
| 23.4 | 76.6 | 10.70 |

Similar ebulliometric experiments were performed using isopentane instead of n-pentane. The boiling point data are summarized in Table II. Again a minimum in the boiling point versus composition curve is observed indicating the formation of a positive azeotrope between HFC-245fa and isopentane. Azeotrope-like or constant boiling mixtures are also formed between these two components. The boiling point at 748 mm Hg is constant at 7±1° C. from about 5 to about 70 weight percent isopentane and from about 95 to about 30 weight percent HFC-245fa.

TABLE II

HFC-245fa/Isopentane Boiling Point Data

| Weight Percent HFC-245fa | Weight Percent Isopentane | Boiling Point (° C.) at 748 mm Hg |
|---|---|---|
| 100.0 | 0.0 | 14.44 |
| 98.90 | 1.10 | 11.24 |
| 97.90 | 2.10 | 9.27 |
| 96.30 | 3.70 | 8.09 |
| 94.26 | 5.74 | 7.70 |
| 92.33 | 7.67 | 7.30 |
| 90.48 | 9.52 | 7.20 |
| 88.3 | 11.7 | 7.01 |
| 84.2 | 15.8 | 6.95 |
| 80.4 | 19.6 | 6.95 |
| 75.4 | 24.6 | 6.95 |
| 69.6 | 30.4 | 7.01 |
| 64.6 | 35.4 | 7.07 |
| 56.5 | 43.5 | 7.08 |
| 44.2 | 55.8 | 7.10 |
| 31.8 | 68.2 | 7.54 |

The boiling point is constant at 7±0.5° C. from about 5 to about 45 weight percent isopentane and from about 95 to about 55 weight percent HFC-245fa.

Ebulliometric experiments were also performed using mixtures of cyclopentane and HFC-245fa. The boiling point data are summarized in Table III. A minimum in the boiling point versus composition curve is observed indicating the formation of a positive azeotrope between HFC-245fa and cyclopentane. Azeotrope-like or constant boiling mixtures are also formed between these two components. The boiling point at 745 mm Hg is constant at 11.7±1° C. from about 5 to about 60 weight percent cyclopentane and from about 95 to about 40 weight percent HFC-245fa. The boiling point is constant at 11.7±0.5° C. from about 5 to about 40 weight percent cyclopentane and from about 95 to about 60 weight percent HFC-245fa.

TABLE III

HFC-245fa/Cyclopentane Boiling Point Data

| Weight Percent HFC-245fa | Weight Percent Cyclopentane | Boiling Point (° C.) at 745 mm Hg |
|---|---|---|
| 100.0 | 0.0 | 14.58 |
| 98.38 | 1.62 | 13.50 |
| 97.59 | 2.41 | 13.21 |
| 95.30 | 4.70 | 12.31 |
| 94.56 | 5.44 | 12.05 |
| 91.70 | 8.30 | 11.96 |
| 89.02 | 10.98 | 11.70 |
| 74.09 | 15.91 | 11.67 |
| 79.7 | 20.3 | 11.67 |
| 75.71 | 24.29 | 11.67 |
| 72.12 | 27.88 | 11.68 |
| 70.45 | 29.55 | 11.71 |
| 59.6 | 40.4 | 11.85 |
| 42.4 | 57.6 | 11.87 |
| 25.8 | 74.2 | 11.90 |

Ebulliometric experiments were also performed using mixtures of n-hexane and HFC-245fa. The boiling point data are summarized in Table IV. A minimum in the boiling point versus composition curve is observed indicating the formation of a positive azeotrope between HFC-245fa and n-hexane. Azeotrope-like or constant boiling mixtures are also formed between these two components. The boiling point at 749 mm Hg is constant at 14±1° C. from about 2 to about 45 weight percent n-hexane and from about 98 to about 55 weight percent HFC-245fa. The boiling point is constant at 14±0.5° C. from about 2 to about 30 weight percent n-hexane and from about 98 to about 70 weight percent HFC-245fa.

TABLE IV

HFC-245fa/N-Hexane Boiling Point Data

| Weight Percent HFC-245fa | Weight Percent N-Hexane | Boiling Point (° C.) at 749 mm Hg |
|---|---|---|
| 100.0 | 0.0 | 14.48 |
| 99.11 | 0.89 | 14.30 |
| 97.67 | 2.33 | 14.08 |
| 94.25 | 5.75 | 13.85 |
| 92.95 | 7.05 | 13.94 |
| 90.44 | 9.56 | 14.00 |
| 83.68 | 16.32 | 14.15 |
| 76.97 | 23.03 | 14.30 |
| 69.06 | 30.94 | 14.43 |
| 65.7 | 34.3 | 14.44 |
| 59.8 | 40.2 | 14.50 |
| 54.9 | 45.1 | 14.60 |
| 44.4 | 55.6 | 14.62 |
| 29.8 | 70.2 | 15.38 |

Ebulliometric experiments were also performed using mixtures of isohexane and HFC-245fa. The boiling point data are summarized in Table V. A minimum in the boiling point versus composition curve is observed indicating the formation of a positive azeotrope between HFC-245fa and isohexane. Azeotrope-like or constant boiling mixtures are also formed between these two components. The boiling point at 744 mm Hg is constant at 13.5±1° C. from about 2 to about 45 weight percent iso-hexane and from about 98 to about 55 weight percent HFC-245fa. The boiling point is constant at 13.5±0.5° C. from about 2 to about 25 weight percent isohexane and from about 98 to about 75 weight percent HFC-245fa.

TABLE V

HFC-245fa/Isohexane Boiling Point Data

| Weight Percent HFC-245fa | Weight Percent Isohexane | Boiling Point (° C.) at 744 mm Hg |
|---|---|---|
| 100.0 | 0.0 | 14.48 |
| 97.82 | 2.18 | 14.30 |
| 96.50 | 3.50 | 14.08 |
| 95.22 | 4.78 | 13.85 |
| 92.75 | 7.25 | 13.94 |
| 90.3 | 10.7 | 14.00 |
| 64.1 | 15.9 | 14.15 |
| 70.3 | 19.7 | 14.30 |
| 75.2 | 24.8 | 14.43 |
| 73.7 | 26.3 | 14.44 |
| 59.9 | 40.1 | 14.47 |
| 49.9 | 50.1 | 14.55 |
| 37.1 | 62.9 | 14.88 |
| 28.2 | 71.8 | 15.72 |

EXAMPLE 2

This example shows that foams prepared using the azeotrope-like compositions described in this invention as the foam blowing agent exhibit improved dimensional stability compared to foams prepared using only a hydrocarbon liquid as the foam blowing agent. The general formulation used to prepare these foams is described in Table VI.

TABLE VI

| | Parts By Weight |
|---|---|
| B-Component (blended polyol) | |
| Thanol R-470X[1] | 100 |
| Tegostab B-8466[2] | 1.5 |
| Dabco R-8020[3] | 1.0 |
| Blowing Agent or Blowing Agent Blend | Varied |
| A-Component (Isocyanate) | |
| Luprinate M-20S[4] (110 Index) | 125 |

[1]A mannich base polyol from Eastman Chemical Products Inc.. Kingsport. Tennessee; hydroxyl number = 470.
[2]A silicone surfactant from Goldschmidt Chemical Co.; Hopewell, Virginia.
[3]A blend of 80% dimethylethanolamine and 20% diethylenediamine from Air Products & Chemicals, Inc. Allentown, Pennsylvania.
[4]A Polymethylene poly(phenyl isocyanate) mixture containing about 40% by weight of methylenebis(phenylisocyanate) with the balance being polymethylene poly(phenyl isocyanate) having a functionality greater than 2; isocyanate equivalent weight = about 134; from BASF Corp.; Wyandotte, Michigan.

The same general procedure, commonly referred to as "hand mixing" was used to prepare all foams. For each blowing agent or blowing agent pair, a premix of polyol, Thanol R-470X, surfactant, Tegostab B-8466, and catalyst, DABCO R-8020, was prepared in the same proportions as displayed in Table 1. About 2.0 kg was blended to insure that all of the foams in a given series wee made with the same master batch of premix. The premix was blended in a one-gallon paint can, and stirred at about 1500 rpm with a Conn 2" diameter ITC mixer until a homogeneous blend was achieved. When mixing was complete the material was transferred to a one-gallon glass bottle and sealed. The bottle was then placed in a refrigerator controlled at 50° F. The foam blowing agents were kept separately in the same refrigerator, along with the 32-oz. tin cans used for mixing vessels. The A-component, isocyanate, was kept in sealed containers at 70° F.

For the individual foam preparations, an amount of B-component equal to 2 times the formulation weight, 205 grams, was weighed into a 32 oz. can pre-conditioned to 50° F. To this was added the required amounts of the individual blowing agents, also pre-conditioned to 50° F. The contents were stirred for two minutes with a Conn 2" ITC mixing blade turning at about 1000 rpm. Following this, the mixing vessel and contents were re-weighed. If there was a weight loss from mixing, the lower boiling blowing agent was added to make up the loss. The contents were stirred for an additional 30 seconds, and the can re-placed in the refrigerator.

After the contents have cooled again to 50° F., approximately 10 minutes, the mixing vessel was removed from the refrigerator and taken to the mixing station. A pre-weighed portion of A-component, isocyanate, was added quickly to the B-component, the ingredients mixed for 10 seconds using a Conn 2" diameter ITC mixing blade at 3000 rpm. and poured into a 10 inch×10 inch×5 inch cardboard cake box and allowed to rise. Cream, initiation, gel and tack free times were recorded for the individual polyurethane foam samples.

The foams were allowed to cure in the boxes at room temperature for at least 24 hours. After curing, the blocks were trimmed to a uniform size and densities measured. Any foams that did not meet the density specification of 2.00±0.05 lb/ft$^3$ were discarded, and new foams prepared using an adjusted amount of blowing agent in the formulation to obtain the specified density.

After ensuring that all the foams meet the density specifications, the foams were tested according to ASTM procedures. The results, are shown in Table VII.

TABLE VII

HFC-245fa/CYCLOPENTANE BLOWN FOAMS

| % 245fa[1] in blowing agent blend | % Cyclo-pentane[2] in blowing agent blend | % Blowing agent in formulation | Foam Density lb/ft[3] (ASTM D-1622) | Dimensional Stability −20° C., 22 Days; % Vol. Change (ASTM D-2126) |
|---|---|---|---|---|
| 100 | 0 | 12.5 | 1.99 | −0.12 |
| 50 | 50 | 9.1 | 2.04 | 0.18 |
| 40 | 60 | 8.7 | 1.98 | 0.40 |
| 30 | 70 | 8.4 | 2.03 | 0.31 |
| 25 | 75 | 8.3 | 2.04 | 0.36 |
| 20 | 80 | 8.1 | 2.02 | 0.51 |
| 10 | 90 | 7.9 | 2.01 | 0.94 |
| 0 | 100 | 7.7 | 1.97[3] | NM[4] |

[1]1,1,1,3,3-pentafluoropropane from AlliedSignal Inc., Morristown. New Jersey.
[2]95% Assay, from Aldrich Chemical Co., Inc., Milwaukee. Wisconsin.
[3]Foam block shrank about 20% (in volume) after initial trimming. Dimensional stability not measured.

In the example it can be seen that by using the azeotrope-like blend of HFC-245fa as the foam blowing agent instead of only cyclopentane, dimensional stability is dramatically improved. The foam blown solely with cyclopentane exhibited excessive shrinkage of about 20% after trimming, resulting in no usable foam to conduct dimensional stability testing; the foam prepared from an azeotrope like blend of cyclopentane and HFC-245fa had good dimensional stability, even after 22 days at—20° C. Dimensional stability generally improved as the relative amount of HFC-245fa in the blowing agent blend increased.

EXAMPLE 3

This example shows that foams prepared using the azeotrope-like compositions of this invention exhibit improved thermal conductivity compared to foams prepared using only a hydrocarbon liquid as the foam blowing agent. The general formulation and techniques used to prepare these foams were the same as that described in Example II.

It can be seen that by using an azeotrope-like blend of HFC-245fa and isopentane as the blowing agent blend, K-factor of the resulting foam is reduced, or insulation value improved, relative to those using only isopentane as the blowing agent. In Table VIII, foam blown solely with HFC-245fa has been assigned a relative K-factor of 1.000. The foam blown with a blend of 10% of HFC-245fa and 90% of isopentane has a K-factor of 1.121 relative to 1.000 for the HFC-245fa blown foam. As the percentage of HFC-245fa increases the relative K-factors decrease, finally reaching 1.000 for the 100% HFC-245fa blown foam. As shown on Table IX, no testing could be done on a foam blown with 100% cyclopentane due to excessive shrinkage of the foam.

TABLE VIII

HFC-245fa/ISOPENTANE BLOWN FOAMS

| % 245fa[1] in blowing agent blend | % Isopentane[2] in blowing agent blend | % Blowing agent in formulation | Foam Density lb/ft[3] (ASTM D-1622) | Relative K-Factor 7 days (ASTM C-518) |
|---|---|---|---|---|
| 100 | 0 | 12.5 | 1.99 | 1.000 |
| 90 | 10 | 11.8 | 1.98 | 1.033 |
| 75 | 25 | 10.7 | 1.97 | 1.039 |
| 50 | 50 | 9.0 | 1.97 | 1.097 |
| 40 | 60 | 8.5 | 2.01 | 1.103 |
| 30 | 70 | 8.0 | 2.05 | 1.103 |
| 25 | 75 | 7.9 | 1.95 | 1.115 |
| 20 | 80 | 7.6 | 2.02 | 1.115 |
| 10 | 90 | 7.3 | 2.00 | 1.121 |
| 0 | 100 | 6.6 | 1.95 | 1.164 |

[1]1,1,1,3,3-pentafluoropropane from AlliedSignal Inc.
[2]95% Assay, from Aldrich Chemical.

TABLE IX

HFC-245fa/CYCLOPENTANE BLOWN FOAMS

| % 245fa[1] in blowing agent blend | % Cyclo-pentane[2] in blowing agent blend | % Blowing agent in formulation | Foam Density lb/ft[3] (ASTM D-1622) | Relative K-Factor 7 days (ASTM C-518) |
|---|---|---|---|---|
| 100 | 0 | 12.5 | 1.99 | 1.000 |
| 90 | 10 | 11.8 | 2.00 | 1.045 |
| 75 | 25 | 10.7 | 1.97 | 1.065 |
| 50 | 50 | 9.1 | 2.04 | 1.085 |
| 40 | 60 | 8.7 | 1.98 | 1.109 |
| 30 | 70 | 8.4 | 2.03 | 1.145 |
| 25 | 75 | 8.3 | 2.04 | 1.158 |
| 20 | 80 | 8.1 | 2.02 | 1.158 |
| 10 | 90 | 7.9 | 2.01 | 1.182 |
| 0 | 100 | 7.7 | 1.97[3] | NM[4] |

[1]1,1,1,3,3-pentafluoropropane from AlliedSignal Inc.
[2]95% Assay, from Aldrich Chemical.
[3]Foam block shrank about 20% (in volume) after initial trimming.
[4]K-Factor could not be measured.

What is claimed is:

1. An azeotrope-like composition consisting essentially of from about 31.6 to about 76.02 weight percent 1,1,1,3,3-pentafluoropropane and from about 68.4 to 23.98 weight percent n-pentane.

2. An azeotrope-like composition consisting essentially of from about 31.6 to 73 weight percent of 1,1,1,3,3-pentafluoropropane and from 27 weight percent to about 68.4 weight percent of n-pentane.

3. An azeotrope-like composition consisting essentially of from about 31.6 to 70.2 weight percent of 1,1,1,3,3-pentafluoropropane and from about 29.8 weight percent to about 68.4 weight percent of n-pentane.

4. A method of preparing polyurethane and polyisocyanurate foams comprising the step of reacting and foaming a mixture of ingredients which react to form the polyurethane or polyisocyanurate foams in the presence of a blowing agent comprising the azeotrope-like composition of claim 1.

5. A method of preparing polyurethane and polyisocyanurate foams comprising the step of reacting and foaming a mixture of ingredients which react to form the polyurethane or polyisocyanurate foams in the presence of a blowing agent comprising the azeotrope-like composition of claim 2.

6. A method of preparing polyurethane and polyisocyanurate foams comprising the step of reacting and foaming a mixture of ingredients which react to form the polyurethane or polyisocyanurate foams in the presence of a blowing agent comprising the azeotrope-like composition of claim 3.

* * * * *